Dec. 22, 1959 E. G. STOVALL ET AL 2,917,976
PIPE WORKING MACHINES
Filed June 6, 1957 2 Sheets-Sheet 1

Elmo G. Stovall
George R. Williams, Jr.
INVENTORS

BY
ATTORNEYS

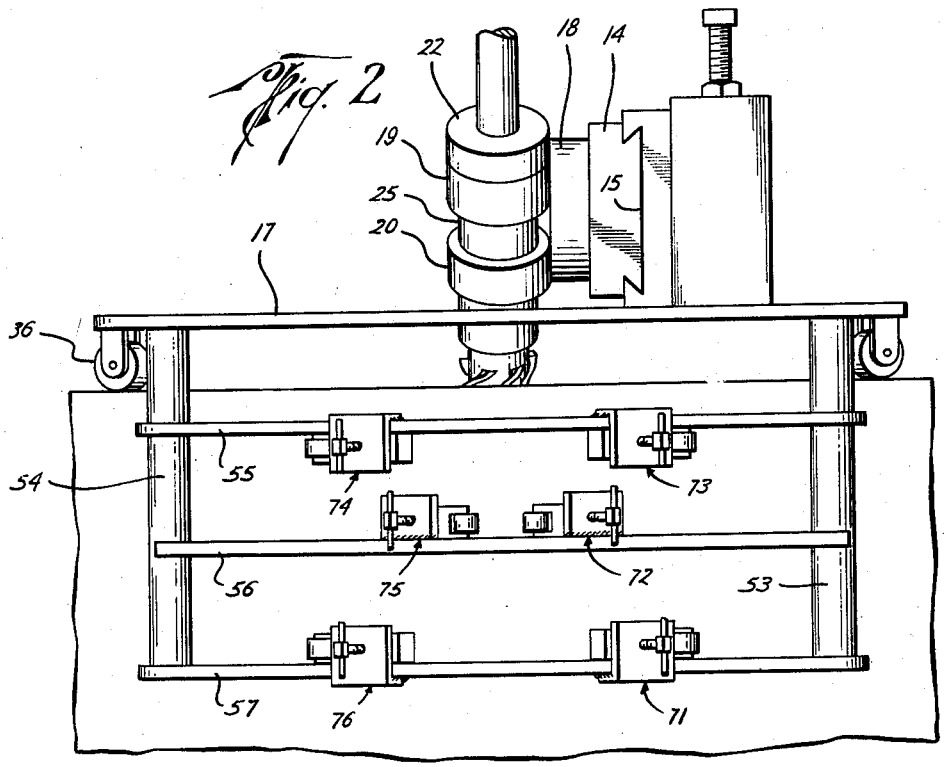
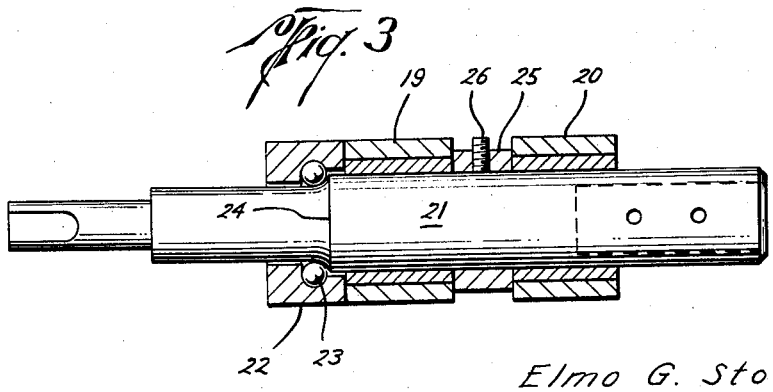

United States Patent Office 2,917,976
Patented Dec. 22, 1959

2,917,976

PIPE WORKING MACHINES

Elmo G. Stovall, Albany, and George R. Williams, Jr., Athens, Ohio

Application June 6, 1957, Serial No. 663,937

3 Claims. (Cl. 90—12)

This invention relates to machines for cutting pipe and more particularly to machines for beveling the end of pipe.

In butt welding large pipe, it has been found that a more satisfactory weld can be obtained when the wall thickness of the two sections of pipe are the same. When sections of pipe of different wall thickness are to be butt welded, it is desirable to reduce the wall of the thicker pipe to the thickness of the thinner pipe. This may be accomplished by beveling the end edge of the pipe. In forming a bevel to effectively reduce the thickness of a pipe to permit it to be welded to another pipe with best results, the bevel must be held to relatively close tolerance.

Machines for cutting pipe and for working the end face of a pipe have customarily run on tracks secured to the exterior of the pipe. These machines operate about a fixed center which is assumed to lie on the central axis of the pipe. However, large pipe is frequently out-of-round. Thus, when a machine operating about a fixed center is utilized to form a bevel on out-of-round pipe, the depth of the bevel will vary according to the distance of the section of pipe being cut from the fixed center about which the machine operates. As these machines will not bevel a pipe end to a constant wall thickness when the pipe is out-of-round, they are not satisfactory for cutting an interior bevel preparatory to welding a section of pipe to another section of pipe having a lesser wall thickness.

This invention provides a pipe beveling machine which will cut a constant bevel on a pipe end even though it be out-of-round. The machine is characterized by a support for the bevel cutter which bears upon a small arc of a pipe being cut. This arc of the pipe positions the machine and includes the area of the pipe being cut. The positioning arc of the pipe changes as the cut progresses about the pipe. Therefore, a constant bevel is cut, even on out-of-round pipe.

It is an object of this invention to provide a pipe beveling machine which will cut a constant bevel on the end of a pipe, be it either perfectly round or out-of-round.

Another object is to provide a pipe beveling machine positioned on the pipe relative to the section of the pipe being cut as the machine progresses about the pipe so that the machine will cut a constant bevel on the pipe.

Another object is to provide a pipe beveling machine which will cut a constant bevel on the end of a pipe and which may be used with a range of pipe sizes.

Another object is to provide a pipe beveling machine in which the weight distribution of the machine is such as to exert a constant force tending to urge the cutting tool into the surface being cut.

Other objects, features and advantages of this invention will appear from the drawings, the specification, and the claims.

In the drawings, wherein there is shown by way of illustration one embodiment of this invention and wherein like reference numerals indicate like parts:

Fig. 2 is a fragmentary elevational view of the machine of Fig. 1 looking toward the machine from the outside of the pipe; and Fig. 3 is a longitudinal sectional view through the shaft mounting of the machine of Fig. 1.

Figure 1:
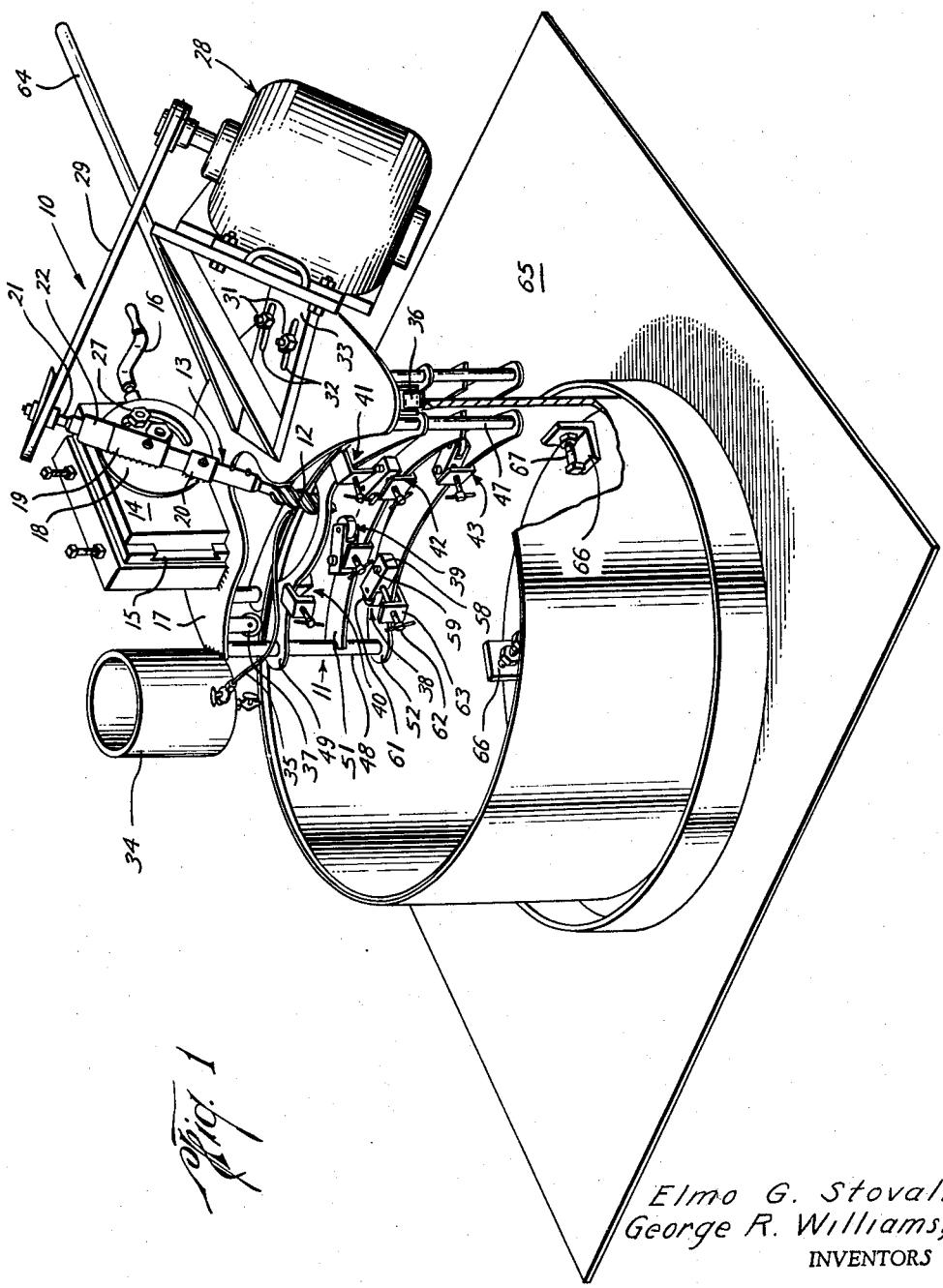
Fig. 1 is a perspective view of a machine constructed in accordance with this invention forming a bevel on a short section of pipe.

The beveling machine of this invention may be conveniently considered as comprising the cutting assembly indicated generally at 10 and the mounting means indicated generally at 11 for mounting the cutter assembly on the pipe and holding it in the desired position relative thereto.

Considering first the cutter assembly 10, the bevel cutter may be provided by any of the conventional cutting tools used for this purpose such as the end mill 12. The end mill 12 is rotatably mounted on a shaft assembly indicated generally at 13 which, in turn, is mounted on a carrier 14 reciprocable in way 15. The carrier 14 is moved along way 15 by a conventional mechanical screw arrangement (not shown) operated by the handle 16. The way 15 is mounted on the frame provided by plate 17.

The detail of the shaft assembly is additionally shown in Fig. 3. A circular plate 18 is rotatably mounted on carrier 14 and spaced journals 19 and 20 are welded thereto and receive the shaft 21. Also secured to the plate 18 as by welding is a thrust bearing 22 having roller bearings 23 therein engageable with a shoulder 24 on the shaft 21. To lock the shaft in position, a collar 25 is received about the shaft between the bushings 19 and 20 and a plurality of set screws 26 secure the collar to the shaft 21.

The plate 18 is held in a desired angular position relative to the carrier 14 by a clamp nut 27.

Power for rotating the mill 12 may be provided in any desired manner such as the prime mover indicated generally at 28 and connected to the shaft 21 through a flexible belt 29. The prime mover 28 is carried on the frame plate 17 and preferably is secured thereto by nuts 31 threadedly received on bolts which extend through slots 32 in the mounting plate 33 for the prime mover 28. This construction permits the mover to be moved generally toward and away from the shaft 21 to tighten the belt 29 to the desired tension.

A suitable receptacle 34 is provided for cutting oil which is delivered from the receptacle to the area of the end mill 12 through a small tube 35.

Depending from the frame plate 17 there is provided means for positioning the bevel cutter relative to the end of the pipe. This means holds the end mill against movement longitudinally of the pipe and toward the pipe and additionally positions the machine relative to the section of pipe being cut, that is, controls radial movement of the machine relative to the section of pipe being cut. The supporting means for the bevel cutter preferably directly engages the section of pipe being cut so that the section of pipe being cut may provide a track for the supporting means and the supporting means may be moved about the entire pipe. This will avoid the necessity for a special track to be secured to the pipe.

Preferably, the supporting means for the end mill is provided by a plurality of rollers which engage the end of the pipe being beveled and the internal and external walls of the pipe being beveled. In the embodiment illustrated, a pair of rollers 36 and 37 are carried by the frame plate 17 and bear against the end of the pipe being beveled to position the machine on the pipe and prevent its moving endwise thereof toward the pipe. As the machine illustrated is intended to be used in the upright position as shown, these rollers limit downward movement of the end mill 12. Preferably, rollers 36 and 37 have a substantial width dimension so that they will be capable of engaging pipe of different radius.

The bevel cutter is held against movement radially of the pipe by a plurality of internal roller assemblies 38 through 43 and a plurality of external roller assemblies 71 through 76. These roller assemblies are carried by substantially concentrically arranged frames. The internal framework includes a pair of columns 47 and 48 depending from the frame plate 17 and three arcuate supports 49, 51, and 52. These supports each carry some of the roller assemblies engaging the inner surface of the pipe. As best shown in Fig. 2, the rollers engaging the exterior surface of the pipe are carried by a like assembly including columns 53 and 54 depending from the frame plate 17, and three arcuate plate like supports 55, 56, and 57 which extend between the columns 53 and 54 and each support some of the roller assemblies.

The roller assemblies are all identical and include an arm 58 pivotally mounted on a support plate by a stud 59. The pivotal mounting is at one end of the arm 58 and a roller 61 is carried in the other end of the arm for engagement with the wall of the pipe. A threaded bolt 62 extends through a suitable mounting bracket 63 welded to one of the plate like members. The bolt 62 bears against the mounting arm at a point spaced from the pivotal mounting to permit adjusting the position of the several rollers toward and away from the pipe. This arrangement will permit the roller assemblies to be adjusted to bear against different size pipe.

Preferably, two of the roller assemblies 39 and 42 are positioned so that their rollers engage the interior of the pipe closely adjacent the mill 12. Likewise, two rollers 72 and 75 are positioned to engage the outside wall of the pipe opposite to the two roller assembies 39 and 42 engaging the inside of the pipe. Adjustment of these four rollers to firmly engage the interior and exterior wall of the pipe, respectively, holds the machine against radial movement relative to the section of the pipe being cut and a constant bevel will be cut. As these four rollers are spaced so close to the end mill 12, other rollers are provided leading and trailing these four rollers to counteract the tendency of the frame to rotate about the end mill 12. These rollers also position the beveling machine on the pipe and prevent radial movement relative to the section of the pipe being cut. Preferably, the remaining rollers are symmetrically spaced longitudinally of the pipe and circumferentially of the pipe relative to the four rollers positioned immediately adjacent the end mill 12. Their spacing should be such as to absorb the tendency of the machine to rotate about the end mill 12 but no further away from the mill than necessary for this purpose to avoid any tendency of the machine to bind in going about an out-of-round section of the pipe. The frame plate 17 and the various pipe engaging rollers thereon may be termed a carriage. In the event a machine is cutting a section of the pipe which is badly out-of-round and the rollers tend to bind, then some of the leading or trailing rollers may be loosened as necessary to permit the machine to pass over the out-of-round portion. However, in so doing, the four rollers positioned closely adjacent the mill will hold the mill against moving radially relative to the section of pipe being cut, and the desired degree of bevel will continue to be cut.

To facilitate moving the beveling machine about the pipe, a handle 64 may be provided.

It is desirable in laying large diameter pipelines to join sections of pipe having different wall thickness together by a short section of pipe which can be easily handled. To provide stability for this short section of pipe while cutting the bevel, a supporting table 65 may be provided having a plurality of lugs 66 secured to the table in circular fashion. Studs 67 extending through these lugs may bear against the wall of the pipe section being fabricated to hold it in place.

By reference to Fig. 1, it will be noted that while the end mill is cutting the interior wall of the pipe, the mounting means for the mill and the prime mover for operating the mill are positioned on the opposite side of the pipe from the cutter, that is, radially outward from the pipe. Thus, the weight of these elements tends to force the mill into the workpiece being cut. This distribution of weight plus the overall weight of the machine is all that is necessary to provide the force for holding the end mill 12 against the workpiece as the machine is rotated about the pipe.

It is believed that the operation of the machine is apparent from the above description of the drawing. The carrier 14 is moved by operation or handle 16 along way 15 toward the center of the pipe to position the cutter in an out-of-the-way position. The machine is then rested on the end of a pipe to be cut and supported by the rollers 36 and 37. The six rollers engaging the interior wall and the six rollers engaging the exterior wall may then be adjusted to bear against the pipe to be cut. The end mill may then be adjusted to the desired angle and upon starting of the end mill, carrier 14 may be moved in its way to cause the end mill to bite into the pipe a sufficient amount to provide the desired bevel. Thereafter, the entire machine is rotated about the pipe to form the desired bevel therein.

From the above it will be appreciated that the objects of this invention have been attained. There has been provided a beveling machine which may employ any desired type of bevel cutter to cut a bevel on a pipe. While the machine illustrated is set up to cut an interior bevel, it will be appreciated that it may also be utilized to cut an exterior bevel. The end mill illustrated is so mounted that it may be used to fabricate any degree of bevel. By adjustment of the position of the rollers of the several roller assemblies engaging the interior and exterior wall of the pipe, the machine may be utilized to bevel pipe of different size.

From the foregoing it will be seen that this invention is one well adapted to attain all of the ends and objects herein above set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipe beveling machine comprising, a bevel cutter, means for operating the bevel cutter, means movably engaging the end of the pipe being beveled and limiting movement of the machine in a direction endwise of the pipe such as would move said cutter to deeper cutting engagement with said end, and spacers movably engaging the inner and outer wall of the pipe being beveled for positioning the machine laterally relative to the section of the end of the pipe where it is being beveled, one group of said spacers engaging the interior and exterior walls of the pipe immediately adjacent the cutter and other groups spaced to engage said walls at points spaced circumferentially of the pipe to either side of said one group to lead and follow said one group respectively.

2. A pipe beveling machine comprising, a frame, a bevel cutter mounted on the frame, means for operating the bevel cutter, rollers carried by the frame and engaging the end of the pipe being beveled and limiting movement of the machine in a direction endwise of the pipe such as would move said cutter to deeper cutting engagement with said end, and rollers engaging the inner and outer walls of the pipe being beveled at points immediately adjacent the cutter only for positioning the machine laterally relative to the section of the end of the pipe where it is being beveled, and other rollers engaging both the inner and outer walls of the pipe at points spaced circumferentially and longitudinally from each other with respect to the pipe being beveled, the mounting for the bevel cutter and the means for operating the bevel cutter positioned on the frame to place them and the cutting face of the cutter on opposite sides of the pipe section being beveled so that their weight will tend to force the cutter into the pipe.

3. A pipe beveling machine comprising, a frame, a bevel cutter mounted on the frame, means for operating the bevel cutter, rollers carried by the frame and engaging the end of the pipe being beveled and limiting movement of the cutter in a direction endwise of the pipe such as would move said cutter to deeper cutting engagement with said end, a pair of substantially concentric supports depending from the frame and receiving therebetween a section of the end of a pipe being beveled lying on one side of the pipe axis, and rollers mounted on the support to engage the inner and outer walls of that section of the pipe being beveled at points immediately adjacent the cutter only for positioning the machine laterally relative to the section of the end of the pipe where it is being beveled, and other rollers engaging both the inner and outer walls at points spaced circumferentially and longitudinally from each other with respect to the pipe being beveled.

References Cited in the file of this patent

UNITED STATES PATENTS

| | | |
|---|---|---|
| 617,336 | Hansen | Jan. 10, 1899 |
| 2,281,353 | Hubbard | Apr. 28, 1942 |
| 2,543,945 | Taylor | Mar. 6, 1951 |
| 2,769,234 | Young | Nov. 6, 1956 |
| 2,807,921 | Dewing et al. | Oct. 1, 1957 |

FOREIGN PATENTS

| | | |
|---|---|---|
| 691,064 | Great Britain | May 6, 1953 |
| 908,215 | Germany | Apr. 1, 1954 |